United States Patent [19]

Morgan et al.

[11] Patent Number: 4,882,057

[45] Date of Patent: Nov. 21, 1989

[54] COMPOSITION AND PROCESS FOR SEPARATING FLUID MIXTURES

[75] Inventors: Charles R. Morgan, Brookeville; Cheng-Chi Chen; Thomas A. Blinka, both of Columbia; Alan S. Obligin, Catonsville, all of Md.

[73] Assignee: W. R. Grace & Co.-Conn., New York, N.Y.

[21] Appl. No.: 266,617

[22] Filed: Nov. 3, 1988

[51] Int. Cl.$^4$ .............................................. B01D 13/00
[52] U.S. Cl. .................................. 210/500.23; 55/16; 55/158; 210/500.28
[58] Field of Search ............... 55/16, 158; 210/500.21, 210/500.22, 500.27, 500.28, 500.33, 500.36, 500.23, 500.41

[56] References Cited

U.S. PATENT DOCUMENTS

| | | |
|---|---|---|
| 3,375,298 | 3/1968 | Fox . |
| 4,468,501 | 8/1984 | Zampini . |
| 4,468,502 | 8/1984 | Malon . |
| 4,472,175 | 9/1984 | Malon . |
| 4,486,202 | 12/1984 | Malon . |
| 4,488,886 | 12/1984 | Zampini . |
| 4,586,939 | 5/1986 | Li ............................................ 55/16 |

OTHER PUBLICATIONS

V. Percec and B. Auman in "Functional Polymers and Sequential Copolymers by Phase Transfer Catalysis", Macromol. Chem. 185, 2319–2336 (1984).

V. Percec and B. Auman in "Polyaromatics with Terminal or Pendant Styrene Groups", Reactive Oligomers, ACS Symposium Series 282, 91–104 (1985).

*Primary Examiner*—Frank Sever
*Attorney, Agent, or Firm*—Vincent L. Fabiano; William W. McDowell, Jr.

[57] ABSTRACT

Disclosed are semipermeable fluid separation membranes prepared from polyaromatic polymers including aromatic repeat units of which at least five mole percent are substituted by moieties having ethylenically unsaturated carbon bonds wherein the polymer is crosslinked through carbon bonds between the ethylenically unsaturated moieties. The invented membranes have enhanced durability yet retain very high fluid, especially gas, permeability.

9 Claims, No Drawings

COMPOSITION AND PROCESS FOR SEPARATING FLUID MIXTURES

BACKGROUND OF THE INVENTION

1. Field of the Invention

The present invention relates to certain substituted, crosslinked polyaromatic fluid separation membranes particularly useful for separating gases, and processes for using these membranes.

2. Background Information

U.S. Pat. No. 4,586,939 discloses gas separation processes using as the separation vehicle single layer semipermeable membranes containing at least one substituted poly(arylene oxide) polymer.

U.S. Pat. No. 4,488,886 discloses asymmetric polymeric gas separation membranes comprised of amorphous aryl substituted arylene oxide polymers.

U.S Pat. Nos. 4,472,175 and 4,486,202 disclose a gas separation membrane comprised of, for example, polyphenylene oxide, a polysulfone, or cellulose acetate, which have been treated with acid to enhance selectivity.

V. Percec and B. Auman in "Functional Polymers and Sequential Copolymers By Phase Transfer Catalysis", *Makromol. Chem.* 185, 2319-2336 (1984), and in "Polyaromatics with Terminal or Pendant Styrene Groups", "*Reactive Oligomers*", ACS Symposium Series 282, 91-104 (1985) disclose vinyl poly(phenylene oxide) polymers crosslinked using the vinyl side chains.

U.S. Pat. No. 3,375,298 discloses polymers comprised of alkyl, including vinyl, substituted polyphenylene oxides which are crosslinked with epoxy, isocyanate, or other crosslinkers reactive with amines.

U.S. Pat. Nos. 4,468,501 and 4,468,502 disclose crosslinked polymers comprised of alkyl polyphenylene oxides having benzylic halogens which are crosslinked by reaction with ammonia or a primary amine.

Although separation membranes have been studied extensively for many years, there remains an unfulfilled need for membranes having increased durability to numerous contaminants present in the fluids these membranes are used to separate.

SUMMARY OF THE INVENTION

The present invention relates to semipermeable fluid separation membranes comprised of polyaromatic polymers having aromatic repeat units which are substituted with side chain groups having ethylenically unsaturated carbon bonds and which are crosslinked through the ethylenically unsaturated side chain groups. The invented membranes are more durable than membranes prepared from similar uncrosslinked polymers and yet retain very high fluid, especially gas, permeability.

DETAILED DESCRIPTION

The present invention relates to the discovery that semipermeable fluid separation membranes can be prepared from polyaromatic polymers constructed of aromatic repeat units of which at least five mole percent are substituted by moieties having ethylenically unsaturated carbon bonds wherein the polymer is crosslinked through carbon bonds between the ethylenically unsaturated moieties. When compared to membranes prepared from similar uncrosslinked polymers, the presently invented membranes have increased durability while retaining very high fluid, especially gas, permeability.

Particularly suitable polymers for making the presently invented membranes contain aromatic repeat units having the following Formula A:

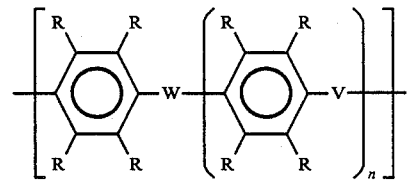

in which:

W is oxygen or $CR_5R_6$, provided W is oxygen when n is 0;

R each independently is hydrogen, halogen, $R_2C=CR_3$, $C_1$ to $C_8$ alkyl radical optionally halogenated at the alpha position, $C_5$ to $C_7$ cycloalkyl radical, $C_1$ to $C_8$ alkoxy radical, $C_6$ to $C_{12}$ aryl radical, aralkyl radical, alkaryl radical, each radical being free of a tertiary alpha-carbon atom, with the proviso that at least 5 mole percent of the repeat units contain an $R_2C=CR_3R_4$ moiety;

$R_2$, $R_3$, and $R_4$ independently are hydrogen, halogen, $C_1$ to $C_{18}$ aliphatic radical, $C_5$ to $C_7$ cycloaliphatic radical, $C_6$ to $C_{12}$ aryl radical, aralkyl radical, or alkaryl radical;

$R_5$ and $R_6$ independently are hydrogen, $C_1$ to $C_{18}$ aliphatic radical unsubstituted or halogen substituted, $C_5$ to $C_7$ cycloaliphatic radical, $C_6$ to $C_{12}$ aryl radical, aralkyl radical, alkaryl radical; or

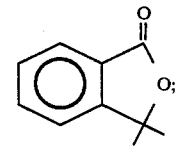

V is 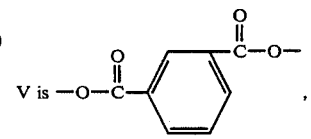,

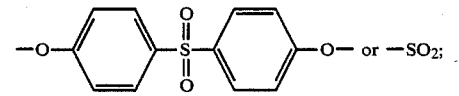

One preferred group of polymers having repeat units of Formula A are polysulfones in which n is 1, $R_5$ and $R_6$ are methyl, V is the diphenyl sulfone moiety or n is 1, W is oxygen and V is $-SO_2-$, and in at least 5 mole percent of the repeat units R is vinyl.

Also preferred are membranes containing units of the Formula B:

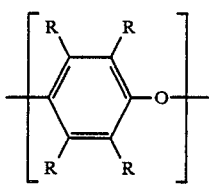

in which R is as defined in Formula A.

As used in the above formulae and throughout the specification and claims, the chemical formulae given for the repeat units indicate the structure of the repeat units as they appear when not crosslinked. Also, as used throughout the specification and claims, aralkyl means an aliphatic carbon chain having from 1-8 carbon atoms substituted by at least one aryl moiety having from 6-12 carbon atoms, and alkaryl means an aryl group having from 6-12 carbon atoms substituted by at least one aliphatic chain having from 1-8 carbon atoms. Vinyl poly(phenylene oxide) means compounds of Formula A wherein at least some of the R groups are vinyl.

The polyaromatic polymers having aromatic repeat units of Formulae A and B which are used in making the presently invented membranes are prepared from monomers which are commercially available or can be synthesized using known methods and materials. For example, polymers having aromatic repeat units of Formula B are prepared by converting at least five mole percent of the methyl groups in poly(2,6-dimethyl-1,4-phenylene oxides) to vinyl groups. This conversion of methyl to vinyl groups may be accomplished using the procedure described in V. Percec et al. "Polyaromatics with Terminal or Pendant Styrene Groups", *Reactive Oligomers*, ACS Symposium Series (1985) which is incorporated fully herein by reference. This conversion procedure generally involves brominating a methyl group in the R position, using a phosphine such as triphenylphosphine to convert the bromomethyl group into a phosphonium salt group, and then reacting with an aldehyde such as formaldehyde (the Wittig reaction) to convert the phosphonium salt group to a vinyl group.

The semipermeable membranes used in this invention are constructed from at least one of the substituted polyaromatic polymers of this invention as recited above. Any polymer that can be blended with the substituted polyaraomtic polymer(s) also can be used in the construction of the membrane and typical polymers include other poly(arylsulfones), other poly(arylene oxides), and polystyrenes. Although the molecular weight of these polymers can vary widely, usually they are within a fifty percent range of the molecular weight of the substituted polyaromatic polymer(s).

Although some blending of polymers may be desirable to impart certain physical characteristics to the membrane, such as strength, durability and flexibility, generally incorporation of other polymers into the membrane preferably is minimized to avoid diluting the flux and selectivity characteristics imparted to the membrane by the substituted polyaromatic polymer. According, the substituted polyaromatic polymer and copolymers described herein constitute at least about 25, preferably at least about 50, and more preferably at least about 75 weight percent of the membrane, depending upon the actual composition of the membrane.

The polymers of this invention are fabricated into membranes by the conventional methods used to prepare other membranes, and in one embodiment, the polymer is dissolved in a suitable solvent to form a solution having from about 1 to about 30, preferably from about 5 to about 20, weight percent polymer. Usually, any relatively nonpolar aromatic, chlorinated aromatic, or aliphatic solvent such as toluene, chlorobenzene, or chloroform are employed. These solvents are used alone or in combination with other polar solvents, such as dimethylformamide, dimethylsulfoxide, dimethylacetamide, acetone, and methylethyl ketone, but in such combinations, the nonpolar solvent(s) constitutes at least about 50 weight percent of the mixture. Water soluble solvents such as tetrahydrofuran and N-methyl pyrrolidinone, diglyme, pyridine, phenol, and 1,4-dioxane also are used. If another polymer is used in the manufacture, then a 0.1 to 20, preferably a 1 to 10 weight percent solution of this other polymer is prepared, generally in the same solvent used to prepare the substituted polyaromatic polymer solution, and then the two or more solutions are mixed at room temperature.

The resulting mixture then is cast on a substantially flat support surface which is removed after casting, or on a porous support material which is not removed after casting. The support surface may be one such as glass or coated paper which is used during production of the membrane and is separated from the formed membrane; but it also can be a porous material such as polyamide fabric which is used to strengthen the finished membrane after formation and during use. The mixture is spread evenly to a uniform thickness, typically with the aid of some instrument (e.g., a doctor blade), air dried under ambient conditions for a suitable length of time, generally in excess of 24 hours. If cast on a glass plate or other nonpermanent support material, the membrane is removed from the support and further air dried. In other embodiments, these membranes can be manufactured by various laboratory and commercial techniques known to the art. These membranes also can be manufactured into structures other than films, such as hollow fibers.

As stated above, the membranes formed with the substituted polyaromatic polymers of this invention are crosslinked. Crosslinking may be induced at any time during the membrane casting process, or on the formed membrane. Formation of the membrane can be facilitated in many cases by partially crosslinking the substituted polyaromatic polymers after casting but before complete solvent removal from the membrane, while the cast film essentially is still fluid. This partial crosslinking increases the viscosity of the casting solution and thus provides a means for controlling the casting process.

The membranes of this invention are crosslinked, either before complete solvent removal from the membrane while the polymer solution essentially is still fluid, or after, by the formation of carbon to carbon bonds between ethylenically unsaturated side chains of the vinyl substituted polyaromatic repeat units of this invention and contained within the film formed. Crosslinking may be accomplished by thermal means as well as by radiation. Preferred radiation techniques include ultraviolet light (UV) and electron beam (EB). Ultraviolet light radiation especially is preferred because of ease of processing and relatively low cost compared to other methods. Where UV radiation is used, photoinitiators, such as alpha-dimethyoxy-alpha-phenyl acteophenone (Irgacure ™ 651, from Ciba-Geigy), may be advantageously included in the casting solution.

Alternatively, thermal crosslinking of the membrane may be accomplished by conventional means. In one technique, the dried membrane is heated under vacuum to a suitable temperature (e.g., 180° C. to 250° C.), for a sufficient time for crosslinking to proceed (e.g., 5 to 30 minutes). Thermal free radical initiators such as benzoyl peroxide also may be used to facilitate crosslinking. The resulting crosslinked membranes are relatively unaffected by organic solvents as compared to uncrosslinked membranes.

The membranes used in this invention are fabricated at any desired thickness although membranes having a thickness less than about 1,000 microns ($\mu$m), preferably less than about 625$\mu$m, most preferably less than about 250 um are most useful. The membranes are of uniform density throughout (dense films), or possess a density gradient through the thickness of the membrane, such that the top surface consists of a thin dense "skin" less than 1 $\mu$m thick, and a porous substructure beneath the skin layer which acts as a mechanical support. Membranes possessing a density gradient are referred to as asymmetric membranes. One method for making asymmetric membranes involves casting a thin film of a suitable polymer solution, optionally followed by at least partial solvent evaporation, and then by gelation in a suitable non-solvent for the polymer. Because membrane flux tends to increase with a decrease in the thickness of the dense section of the membrane, generally thinner membranes are more desirable. Consequently, asymmetric membranes generally are preferred. Of course, the desired thickness of the membrane is determined by many other factors of which flux is just one, and thus the preferred membrane thickness and structure will vary from application to application.

The crosslinked polyaromatic polymer membranes of this invention are particularly useful whenever it is desirable to utilize a membrane having resistance to organic solvents or vapors, high operating temperatures, and plasticizing gases (e.g., carbon dioxide). The crosslinked polyaromatic polymer membranes of this invention also have improved physical properties compared to the uncrosslinked polyaromatic polymer membranes.

The membranes of this invention are used to separate fluids, i.e., a fluid mixture is contacted on one side of the membrane, typically under pressure, and one or more constituents of the mixture pass through the membrane at a rate different from that at which the remaining constituents pass through the membrane. This results in an enriched fraction of the desired fluid forming on one side of the membrane while a depleted fraction of the same fluid is formed on the other side of the membrane. Generally, the desired fluid is that which has not passed through the membrane, e.g., in separating carbon dioxide from the other gaseous constituents of natural gas, carbon dioxide passes through the membrane while the majority of the other gaseous constituents are rejected. The presently invented membranes also are used when the desired fluid is that which has passed through the membrane.

The presently invented membranes are used to separate any fluids that are mixtures of components that pass through the membranes at different rates. The fluids can be liquid or gaseous. Liquid fluids commonly are aqueous, but organic liquids can be separated provided the organic component(s) do not destroy the membrane in the time needed to effect separation. Preferably, the presently invented membranes are used to separate gases. For example, these membranes are used to purify natural gas, for recovery of hydrogen in refinery and ammonia plants, for separation of carbon monoxide from hydrogen in syngas systems, for separation of carbon dioxide or hydrogen sulfide from hydrocarbons, for enrichment of oxygen and nitrogen from air for increased combustion or inerting streams, respectively.

Operating temperatures employed in practicing this invention can vary widely and generally are those used under similar separation processes. Any temperature at which the membrane is physically and chemically stable is used while the pressure varies with, among other parameters, the physical strength of the membrane.

Preparation of membranes in accordance with this invention will become further apparent from the following non-limiting examples.

EXAMPLE 1

A solution of 50 grams of poly(2,6-dimethyl-1,4-phenylene oxide), reportedly having a molecular weight of about 60,000, was dissolved in 500 ml of nitrobenzene. The solution was brought to reflux in a 1,000 ml round-bottomed flask and 13.3 g of bromine was added through a funnel over a 30-minute period. The solution was refluxed for 18 hours, and then cooled to room temperature. The resulting brominated polymer was precipitated by decanting into methanol. The precipitated polymer product contained 15 mole percent benzyl bromination and 6 mole percent adventitious arylbromination as determined by NMR analysis.

Benzyl-, aryl-brominated polymer (5.8 g) prepared in this manner then was dissolved in 350 ml of toluene and a separate solution of 5.54 g of triphenylphosphine in 150 ml of toluene was then added dropwise to the polymer solution. After the solutions were completely mixed, the resulting mixture was refluxed for 15 hours and then cooled to room temperature. The liquid was decanted, the solid polymeric residue was dissolved in 150 ml of methylene chloride, and the solution was cooled to about 5° C. 18 milliliters of 37% formaldehyde solution (in water) was stirred into the polymer solution, then 10.2 g of sodium hydroxide in 15 ml of water was added dropwise.

An approximately 90 percent yield of vinyl poly(phenylene oxide) was obtained after isolation of the resulting precipitated polymer. The precipitated vinyl poly(phenylene oxide) polymer product contained 15 mole percent vinyl groups and 6 mole percent adventitious arylbromination as determined by NMR analysis.

Vinyl poly(phenylene oxide) polymer (with partial aryl bromination) prepared in this manner was dissolved to a 15 weight percent concentration in toluene. This casting solution was filtered, and then cast onto a clean glass plate, using a Gardner Knife to spread the solution to a uniform thickness. The film then was partially enclosed in a container to allow slow solvent evaporation. The film then was delaminated from the glass substrate by immersion in a water bath. Upon air drying, a tough, transparent, dense film approximately 30 $\mu$m thick was obtained. The polymer film then was heated to 200° C. under vacuum for 30 minutes to provide a thermally crosslinked membrane.

The thermally crosslinked membrane which resulted was insoluble in organic solvents such as toluene that normally dissolved the uncrosslinked polymer, showing greatly improved resistance to organics compared to the uncrosslinked membrane.

The permeability and selectivity (the selectivity of a membrane to two gases is defined as the ratio of the permeabilities of the membrane to the gases of interest, generally such that the ratio is greater than one) were measured in a laboratory apparatus wherein the membrane was pressurized with a gas stream consisting of pure carbon dioxide (for measurement of the carbon dioxide permeability) or pure methane (for measurement of the methane permeability). The gas that permeated through the membrane (permeate gas) was allowed to fill an evacuated reservoir of known volume. By measuring the rate of pressure increase in the reservoir, the gas temperature, the membrane area, and the pressure differential between the two sides of the membrane, the gas permeability was calculated through use of the Ideal Gas Law. The carbon dioxide permeability and selectivity of this membrane to carbon dioxide and methane are listed in TABLE A below.

EXAMPLE 2

Another vinyl poly(phenylene oxide) polymer was prepared using the procedure of Example 1 except that 13.3 g of bromine was added to 20 g of poly(2,6-dimethyl-1,4-phenylene oxide) in the bromination step. Benzyl-, aryl-brominated polymer (9.77 g) prepared in this manner was dissolved in 600 ml of toluene. Triphenylphosphine (170 g) dissolved in 200 ml of toluene then was added and the solution was brought to reflux for 15 hours. The resulting phosphonium salt was isolated from solution by decanting the toluene, and was redissolved in a mixture of 250 ml of methylene chloride and 250 ml of methanol. Then 48 ml of 37% aqueous formaldehyde solution and 31 g of sodium hydroxide dissolved in 30 ml of water were added to the cooled solution according to the procedure of Example 1.

The resulting precipitated vinyl poly(phenylene oxide) polymer product contained 17 mole percent vinyl groups and 26 mole percent adventitious aryl-bromination as determined by NMR analysis. A thermally crosslinked membrane formed from this polymer, according to the procedure of Example 1, was insoluble in toluene showing greatly improved resistance to organics compared to the uncrosslinked membrane. The permeability and selectivity of this membrane were measured according to the procedure of Example 1, and are listed in TABLE A below.

EXAMPLE 3

Another vinyl poly(phenylene oxide) polymer was prepared using the procedure of Example 1 except that 13.3 g of bromine was added to a refluxing solution of 50 g of poly(2,6-dimethyl-1,4-phenylene oxide) dissolved in 500 ml of chlorobenzene. After cooling the solution to room temperature, an additional 26.7 g of bromine was added, and the solution was maintained at room temperature for 18 hours. The resulting benzyl, aryl-brominated polymer was precipitated from solution using the procedure of Example 1. Benzyl-, aryl-brominated polymer (30 g) prepared in this manner was dissolved in 300 ml of toluene, 2.37 g of triphenylphosphine dissolved in 100 ml of toluene then was added and the solution was heated at reflux for 15 hours. The resulting phosphonium salt was isolated from solution by decanting the toluene, and was redissolved in a mixture of 200 ml of methylene chloride and 50 ml of methanol. Then 8 ml of 37% aqueous formaldehyde solution and 4.33 g of sodium hydroxide dissolved in 10 ml of water were added to the cooled solution according to the procedure of Example 1.

The resulting precipitated vinyl poly(phenylene oxide) polymer product contained 15 mole percent vinyl groups and 48 mole percent aryl-bromination as determined by NMR analysis. A thermally crosslinked membrane formed from this polymer, according to the procedure of Example 1, was insoluble in toluene showing greatly improved resistance to organics compared to the uncrosslinked membrane. The permeability and selectivity of this membrane were measured according to the procedure of Example 1, and are listed in TABLE A below.

EXAMPLE 4

Another vinyl poly(phenylene oxide) polymer was prepared using the procedure of Example 1 except that 26.7 g of bromine was added to a refluxing solution of 50.g.of poly(2,6-dimethyl-1,4-phenylene oxide) dissolved in 500 ml of chlorobenzene. After cooling the solution to room temperature, an additional 66.7 g of bromine was added, and the solution was maintained at room temperature for 18 hours. The resulting benzyl-, aryl-brominated polymer was precipitated from solution using the procedure of Example 1. Benzyl, aryl-brominated polymer (5.0 g) prepared in this manner was dissolved in 250 ml of toluene. Triphenylphosphine (5.67 g) dissolved in 100 ml of toluene then was added and the solution was heated at reflux for 15 hours. The resulting phosphonium salt was isolated from solution by decanting the toluene, and was redissolved in 150 ml of methylene chloride. Then 17 ml of 37% aqueous formaldehyde solution and 10.4 g of sodium hydroxide dissolved in 20 ml of water were added to the cooled solution according to the procedure of Example 1.

The resulting precipitated vinyl poly(phenylene oxide) polymer product contained 20 mole percent vinyl groups and 78 mole percent aryl-bromination as determined by NMR analysis. A thermally crosslinked membrane formed from this polymer, according to the procedure of Example 1, was insoluble in toluene showing greatly improved resistance to organics compared to the uncrosslinked membrane. The permeability and selectivity of this membrane were measured according to the procedure of Example 1, and are listed in TABLE A below.

EXAMPLE 5

Another vinyl poly(phenylene oxide) polymer was prepared using the procedure of Example 1 except that 26.5 g of bromine was added to a refluxing solution of 50 g of poly(2,6-dimethyl-1,4-phenylene oxide) dissolved in 500 ml of chlorobenzene. After cooling the solution to room temperature, an additional 26.5 g of bromine was added, and the solution was maintained at room temperature for 18 hours. The resulting benzyl-, aryl-brominated polymer was precipitated from solution using the procedure of Example 1. Benzyl-, aryl-brominated polymer (1.0 g) prepared in this manner was dissolved in a mixture of 100 ml of toluene and 25 ml of chloroform. Triphenylphosphine (1.44 g) dissolved in 50 ml of toluene then was added and the solution was heated at reflux for 15 hours. The resulting phosphonium salt was isolated from solution by decanting the toluene, and was redissolved in a mixture of 150 ml of methylene chloride and 30 ml of methanol. Then 4.5 ml of 37% aqueous formaldehyde solution and 2.63 g of sodium hydroxide dissolved in 10 ml of water were added to the cooled solution according to the procedure of Example 1.

The resulting precipitated vinyl poly(phenylene oxide) polymer product contained 36 mole percent vinyl groups and 46 mole percent aryl-bromination as determined by NMR analysis. A thermally crosslinked membrane formed from this polymer, according to the procedure of Example 1, was insoluble in toluene showing greatly improved resistance to organics compared to the uncrosslinked membrane. The permeability and selectivity of this membrane were measured according to the procedure of Example 1, and are listed in TABLE A below.

EXAMPLE 6

A membrane prepared from a vinyl poly(phenylene oxide) polymer containing 32 mole percent vinyl groups and 8 mole percent aryl bromine was prepared using the casting procedure of Example 1, except that the casting solution contained 8 weight percent vinyl poly(phenylene oxide) in xylene. The dope was cast on a glass plate using a Gardner Knife with a blade gap of 250μm. A dense film formed after the solvent evaporated. The dense film was delaminated from the glass plate by immersion into a water bath. The uncrosslinked membrane was soluble in toluene and chloroform, showing that it has very poor resistance to some common organic materials which often are found in a commercial gas stream. The permeability and selectivity of this membrane were measured according to the procedure of Example 1, and are listed in TABLE A below.

EXAMPLE 7

A membrane prepared from a vinyl poly(phenylene oxide) polymer containing 32 mole percent vinyl groups and 8 mole percent aryl bromine was prepared using the casting procedure of Example 1, except that the casting solution also contained approximately 2 weight percent of a photoinitiator (Irgacure ™-651, from Ciba-Geigy) based on the amount of polymer. The dope was cast on a glass plate using a Gardner Knife with a blade gap of 250 μm. The cast dope was exposed to UV of intensity of 10 milliwatts per square centimeter ($mw/cm^2$) for 5 minutes to form a film swollen with solvent. A dense film formed after the solvent evaporated. The dense film was delaminated from the glass plate by immersion in a water bath. The UV crosslinked membrane was insoluble in toluene showing greatly improved resistance to organics compared to the uncrosslinked membrane of Example 6. The permeability and selectivity of this membrane were measured according to the procedure of Example 1, and are listed in TABLE A below.

EXAMPLE 8

A membrane prepared from a vinyl poly(phenylene oxide) polymer containing 37.6 mole percent vinyl groups and 3 mole percent aryl bromine was prepared using the casting procedure of Example 1, except that the casting solution contained 15 weight percent vinyl poly(phenylene oxide) in toluene. The dope was cast on a glass plate using a Gardner Knife with a blade gap of 300 μm. A dense film formed after the solvent evaporated. The dense film was delaminated from the glass plate by immersion into a water bath. The film then was exposed to an electron beam of intensity 1.7 milliamperes. The EB crosslinked membrane was insoluble in toluene showing greatly improved resistance to organics compared to the uncrosslinked membrane. The permeability and selectivity of this membrane were measured according to the procedure of Example 1, and are listed in TABLE A below.

EXAMPLE 9

A membrane prepared from a vinyl poly(phenylene oxide) polymer containing 26 mole percent vinyl groups and less than 10 mole percent aryl bromine was prepared using the casting procedure of Example 1, except that the casting solution contained 15 weight percent vinyl poly(phenylene oxide) in toluene. The dope was cast on a glass plate using a Gardner Knife with a blade gap of 100 μm. A dense film formed after the solvent evaporated. The dense film was delaminated from the glass plate by immersion into a water bath. The thermally crosslinked membrane formed according to the procedure of Example 1 was insoluble in toluene showing greatly improved resistance to organics compared to the uncrosslinked membrane. The membrane was tested in a laboratory apparatus wherein a feed gas having a composition of 30 percent carbon dioxide and 70 percent methane was swept over the high pressure (feed) side of the membrane at a constant rate such that the gas composition remained constant. The permeability of the membrane to the gas mixture was determined by a method similar to that described in Example 1, except that the cell containing the membrane sample was modified to allow the gas mixture to flow over the membrane surface rapidly enough to maintain a constant gas composition, and a gas chromatograph was employed to measure the gas composition of the feed and permeate gas streams. The permeability and selectivity of this membrane are listed in TABLE A below.

The performance of the membranes of this invention, as demonstrated in Examples 1 through 10, can be compared to the performance of dense membranes of cellulose acetate/cellulose triacetate (hereinafter "CA/CTA") membrane which are considered representative of membranes generally used in gas separation. The performance of such membranes is shown in comparative Example 10 below.

EXAMPLE 10

A membrane was prepared from a blend of cellulose acetate (Kodak) and cellulose triacetate (Kodak) by dissolving 12 g cellulose triacetate in 80 g of dioxane, 8 g cellulose acetate in 120 g of acetone, then blending the two solutions together. The resulting polymer solution was cast on a glass plate using a Gardner Knife with a blade gap of 400 μm. A dense film formed after the solvent evaporated. The dense film was delaminated from the glass plate by immersion into a water bath, and annealed by heating to 150° C. for 2 hours under vacuum. The permeability and selectivity of this membrane were measured according to the procedure of Example 1, and are listed in TABLE A below.

TABLE A

| Membrane of Example No. | Mole % Vinyl | Mole % Bromine | Carbon Dioxide Permeability | Carbon Dioxide/ Methane Selectivity | Crosslinking Method |
| --- | --- | --- | --- | --- | --- |
| 1 | 15 | 6 | 56.4 | 18.7 | thermal |
| 2 | 17 | 26 | 65.5 | 18.2 | thermal |
| 3 | 15 | 48 | 79.7 | 20.4 | thermal |
| 4 | 20 | 78 | 72.0 | 21.1 | thermal |
| 5 | 36 | 46 | 44.6 | 21.2 | thermal |
| 6 | 32 | 8 | 52.0 | 20.0 | none |

TABLE A-continued

| Membrane of Example No. | Mole % Vinyl | Mole % Bromine | Carbon Dioxide Permeability | Carbon Dioxide/ Methane Selectivity | Cross-linking Method |
|---|---|---|---|---|---|
| 7 | 32 | 8 | 50.4 | 20.0 | UV |
| 8 | 38 | 3 | 57.9 | 17.9 | EB |
| 9 | 26 | 10 | 61.9 | 21.0 | thermal |
| 10 | N/A** | N/A** | 14.8 | 19.3 | N/A** |

*Permeability in Barrers = $10^{-10} \times cm^3 \times cm \times cm^{-2} \times s^{-1} \times (cmHg)^{-1}$
**N/A = Not applicable

EXAMPLE 11

Another vinyl poly(phenylene oxide) polymer was prepared using the procedure of Example 1 except that 32.8 g of bromine was added to 50 g of poly(2,6-dimethyl-1,4-phenylene oxide) in the bromination step. Benzyl-, aryl-brominated polymer (10 g) prepared in this manner was dissolved in 200 ml of 1,2dichloroethylen. Triphenylphosphine (13 g) dissolved in 50 ml of 1,2-dichloroethylene then was added and the solution was heated at reflux for 15 hours. Then 12.5 ml of 37% formaldehyde solution and 5 g of sodium hydroxide dissolved in 10 ml of water were added to the cooled solution according to the procedure of Example 1. The resulting precipitated vinyl poly(phenylene oxide) polymer product contained 32 mole percent vinyl groups and 8 mole percent aryl-bromination as determined by NMR analysis. Dense films of this vinyl poly(phenylene oxide) polymer were prepared according to the procedure of Example 1, except that half of the film samples contain 0.75 weight percent benzoyl peroxide. The films were heat treated in vacuum under various conditions as shown below in TABLE B. This example shows that a free radical generating species such as benzoyl peroxide can be advantageously used to shorten the time of thermal exposure and/or lower the crosslinking temperature of the membrane.

TABLE B

| Conditions | With Benzoyl Peroxide-Toluene Solubility | Without Benzoyl Peroxide-Toluene Solubility |
|---|---|---|
| 180° C., 30 min | insoluble | insoluble |
| 180° C., 15 min. | insoluble | soluble |
| 135° C., 15 min. | insoluble | soluble |

EXAMPLE 12

Another vinyl poly(phenylene oxide) polymer was prepared using the procedure of Example 1 except that 81.1 g was added to 100 g of poly(2,6-dimethyl-1,4-phenylene oxide) in the bromination step. Triphenylphosphine (350 g) and 400 ml of methanol then was added and the solution was brought to reflux for 15 hours. Then 200 ml of 37% formaldehyde solution and 80 g of sodium hydroxide dissolved in 150 ml of water were added to the cooled solution according to the procedure of Example 1. The resulting precipitated vinyl poly(phenylene oxide) polymer product contained 50.4 mole percent vinyl groups and approximately 8 mole percent aryl-bromination as determined by NMR analysis. This vinyl poly(phenylene oxide) polymer (3.00 g) was dissolved in a mixture of 42.8 g of carbon tetrachloride and 14.2 g of methyl ethyl ketone together with 0.15 g of Irgacure TM -687 The resulting polymer solution was cast on a glass plate as described in Example 1. After casting, the dope was exposed to UV of intensity of 10 mw/cm² for 20 seconds. The crosslinked dope film then was immersed in acetone to precipitate the polymer and form the asymmetric membrane structure. The average carbon dioxide and nitrogen permeability of the crosslinked vinyl poly(phenylene oxide) membrane were 20.4 ft³ (STP)/ft²/hour/100 psi and 1.38 ft³ (STP)/ft²/hour/100 psi, respectively, using the procedure of Example 1.

EXAMPLE 13

A vinyl poly(arylether sulfone) polymer was prepared using the procedure of Example 1, except that the polymer employed was a poly(arylether sulfone) (TMBAPS) prepared from tetramethyl bisphenol A and 4,4'-dichlorodiphenylsulfone. A solution of 0.78 g of bromine in 5 ml of chlorobenzene was added to a refluxing solution of TMBAPS dissolved in 50 ml of chlorobenzene. The resulting benzyl-brominated polymer was precipitated in methanol. According to the procedure of Example 1, 1.0 g of the benzyl-brominated TMBAPS was dissolved in 50 ml of dichloroethane. Then 0.54 g of triphenylphosphine was added and the resulting solution brought to reflux for 18 hours. The solution was cooled to 5° C. and 0.19 g sodium hydroxide dissolved in 5 ml of water together with 0.75 ml of 37% aqueous formaldehyde solution were added according to the procedure of Example 1. The resulting precipitated vinyl TMBAPS contained 12.2 mole percent vinyl groups and 8.7 mole percent residual benzyl bromination as determined by NMR analysis. A thermally crosslinked film of this vinyl TMBAPS polymer is prepared according to the procedure of Example 1, and is insoluble in toluene showing greatly improved resistance to organics compared to the uncrosslinked membrane. The permeability and selectivity of this membrane are measured according to the procedure of Example 1.

These examples describe various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

Contemplated equivalents of the presently invented membranes are membranes prepared from other polymers constructed of repeat units substituted by ethylenically unsaturated moieties wherein the polymer durability is enhanced by crosslinking through the ethylenically unsaturated moieties and processes for using such membranes to separate fluids, preferably gases.

We claim:

1. A material comprising properties sufficient for use as a semipermeable fluid separation membrane including a composition of up to about 1,000 microns thick of a polyaromatic polymer including aromatic repeat units of which at least 5 mole percent are substituted by moieties having ethylenically unsaturated carbon bonds wherein the polymer is crosslinked by carbon bonds between the ethylenically unsaturated moieties.

2. A membrane of claim 1 wherein the polymer includes aromatic repeat units having the formula:

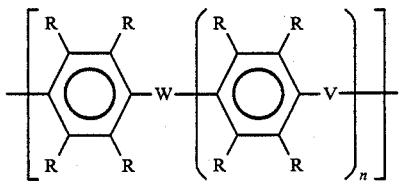

in which:
W is oxygen or $CR_5R_6$, provided W is oxygen when n is 0;
R each independently is hydrogen, halogen, $R_2C=CR_3R_4$, $C_1$ to $C_8$ alkyl radical optionally halogenated at the alpha position, $C_5$ to $C_7$ cycloalkyl radical, $C_1$ to $C_8$ alkoxy radical, $C_6$ to $C_{12}$ aryl radical, aralkyl radical, alkaryl radical, each radical being free of a tertiary alpha-carbon atom, with the proviso that at least 5 mole percent of the repeat units contain an $R_2C=CR_3R_4$ moiety;
$R_2$, $R_3$, and $R_4$ independently are hydrogen, halogen, $C_1$ to $C_{18}$ aliphatic radical, $C_5$ to $C_7$ cycloaliphatic radical, $C_6$ to $C_{12}$ aryl radical, aralkyl radical, or alkaryl radical;
$R_5$ and $R_6$ independently are hydrogen, $C_1$ to $C_{18}$ aliphatic radical unsubstituted or halogen substituted, $C_5$ to $C_7$ cycloaliphatic radical, $C_6$ to $C_{12}$ aryl radical, aralkyl radical, or alkaryl radical; or

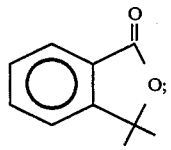

V is 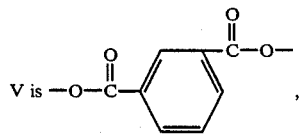,

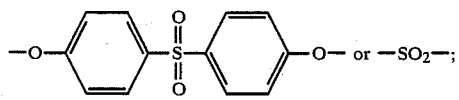

and n is 0 or 1.

3. A membrane of claim 2 wherein the polymer includes aromatic repeat units having the formula:

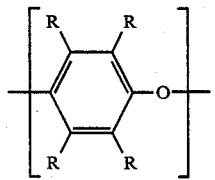

in which
R each independently is hydrogen, halogen, $R_2C=CR_3R_4$, $C_1$ to $C_8$ alkyl radical optionally halogenated at the alpha position, $C_5$ to $C_7$ cycloalkyl radical, $C_1$ to $C_8$ alkoxy radical, $C_6$ to $C_{12}$ aryl radical, aralkyl radical, alkaryl radical, each radical being free of a tertiary alpha-carbon atom, with the proviso that at least 5 mole percent of the repeat units contain an $R_2C=CR_3R_4$ moiety; and
$R_2$, $R_3$, and $R_4$ independently are hydrogen, halogen, $C_1$ to $C_{18}$ aliphatic radical, $C_5$ to $C_7$ cycloaliphatic radical, $C_6$ to $C_{12}$ aryl radical, aralkyl radical, or alkaryl radical.

4. A membrane of claim 3 wherein the aromatic repeat units are benzyl and phenyl-brominated 2,6-dimethyl-1,4-phenylene oxides.

5. A combination comprising a semipermeable fluid separation membrane including as a film of up to about 1,000 microns thick or a hollow fiber a polyaromatic polymer further including aromatic repeat units of which at least 5 mole percent are substituted by moieties having ethylenically unsaturated carbon bonds wherein the polymer is crosslinked through carbon bonds between the ethylenically unsaturated moieties and a mixture of fluids in contact with the membrane wherein at least one of the fluids is enriched on one side of the membrane.

6. A combination of claim 5 wherein the mixture of fluids is gaseous.

7. A combination of claim 6 wherein the polymer includes aromatic repeat units having the formula:

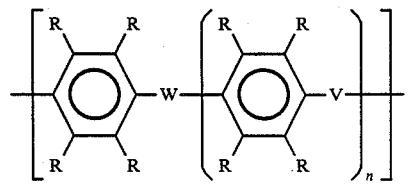

in which:
W is oxygen or $CR_5R_6$, provided W is oxygen when n is 0;
R each independently is hydrogen, halogen, $R_2C=CR_3R_4$, $C_1$ to $C_8$ alkyl radical optionally halogenated at the alpha position, $C_5$ to $C_7$ cycloalkyl radical, $C_1$ to $C_8$ alkoxy radical, $C_6$ to $C_{12}$ aryl radical, aralkyl radical, alkaryl radical, each radical being free of a tertiary alpha-carbon atom, with the proviso that at least 5 mole percent of the repeat units contain an $R_2C=CR_3R_4$ moiety;
$R_2$, $R_3$, and $R_4$ independently are hydrogen, halogen, $C_1$ to $C_{18}$ aliphatic radical, $C_5$ to $C_7$ cycloaliphatic radical, $C_6$ to $C_{12}$ aryl radical, aralkyl radical, or alkaryl radical;
$R_5$ and $R_6$ independently are hydrogen, $C_1$ to $C_{18}$ aliphatic radical unsubstituted or halogen substituted, $C_5$ to $C_7$ cycloaliphatic radical, $C_6$ to $C_{12}$ aryl radical, aralkyl radical, or alkaryl radical; or

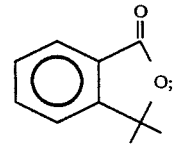

V is 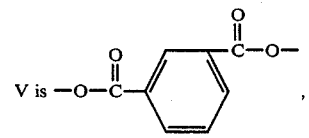,

-continued

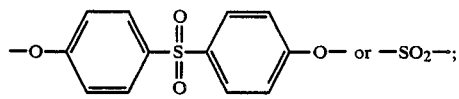

and n is 0 or 1.

8. A combination of claim 7 wherein the polymer includes aromatic repeat units having the formula:

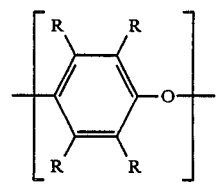

in which
R each independently is hydrogen, halogen, $R_2C=CR_3R_4$, $C_1$ to $C_8$ alkyl radical optionally halogenated at the alpha position, $C_5$ to $C_7$ cycloalkyl radical, $C_1$ to $C_8$ alkoxy radical, $C_6$ to $C_{12}$ aryl radical, aralkyl radical, alkaryl radical, each radical being free of a tertiary alpha-carbon atom, with the proviso that at least 5 mole percent of the repeat units contain an $R_2C=CR_3R_4$ moiety; and
$R_2$, $R_3$, and $R_4$ independently are hydrogen, halogen, $C_1$ to $C_{18}$ aliphatic radical, $C_5$ to $C_7$ cycloaliphatic radical, $C_6$ to $C_{12}$ aryl radical, aralkyl radical, or alkaryl radical.

9. A combination of claim 8 wherein the aromatic repeat units are benzyl and phenyl-brominated 2,6-dimethyl-1,4-phenylene oxides.

* * * * *